US012596171B2

(12) United States Patent
Davis et al.

(10) Patent No.: US 12,596,171 B2
(45) Date of Patent: Apr. 7, 2026

(54) APPARATUSES, METHODS AND COMPUTER PROGRAMS FOR LOCATING MOBILE DEVICES BY USING PHOTOACOUSTICALLY-GENERATED AUDIO SIGNALS

(71) Applicant: NOKIA TECHNOLOGIES OY, Espoo (FI)

(72) Inventors: Ian Davis, Delgany (IE); Akshat Agarwal, Clonmagaddan (IE); Nicholas Jeffers, Newtown Mount Kennedy (IE); Diarmuid O'Connell, Athy (IE); Oliver Burns, Oldcastle (IE)

(73) Assignee: NOKIA TECHNOLOGIES OY, Espoo (FI)

( * ) Notice: Subject to any disclaimer, the term of this patent is extended or adjusted under 35 U.S.C. 154(b) by 576 days.

(21) Appl. No.: 18/006,376

(22) PCT Filed: Jul. 6, 2021

(86) PCT No.: PCT/FI2021/050524
§ 371 (c)(1),
(2) Date: Jan. 20, 2023

(87) PCT Pub. No.: WO2022/018324
PCT Pub. Date: Jan. 27, 2022

(65) Prior Publication Data
US 2024/0012094 A1      Jan. 11, 2024

(30) Foreign Application Priority Data
Jul. 21, 2020    (GB) ...................................... 2011252

(51) Int. Cl.
*G01S 5/30* (2006.01)
*G01S 1/74* (2006.01)
*G01S 1/80* (2006.01)

(52) U.S. Cl.
CPC .................. *G01S 5/30* (2013.01); *G01S 1/75* (2019.08); *G01S 1/80* (2013.01)

(58) Field of Classification Search
CPC ..... G01S 5/30; G01S 1/75; G01S 1/80; G01S 1/752; G01S 5/18; H04R 1/083;
(Continued)

(56) References Cited

U.S. PATENT DOCUMENTS

| | | | |
|---|---|---|---|
| 4,641,377 A | 2/1987 | Rush et al. | |
| 4,689,827 A | 8/1987 | Gurney, Jr. | |

(Continued)

FOREIGN PATENT DOCUMENTS

| | | | | | |
|---|---|---|---|---|---|
| CN | 106324562 A | * | 1/2017 | .............. | G01W 1/02 |
| CN | 107490781 A | * | 12/2017 | .............. | G01W 1/02 |

(Continued)

OTHER PUBLICATIONS

Translation of CN106324562 (Year: 2016).*
(Continued)

*Primary Examiner* — Daniel Pihulic
(74) *Attorney, Agent, or Firm* — ALSTON & BIRD LLP

(57) ABSTRACT
Examples of the disclosure relate to apparatus (101) for positioning mobile devices (105). The apparatus (101) comprises means for: obtaining a time of arrival of at least one audio signal (131) at a mobile device (105), wherein the audio signal (131) is generated with a photoacoustic effect; and using the time of the arrival of the audio signal (131) to estimate a location of the mobile device (105).

18 Claims, 6 Drawing Sheets

(58) Field of Classification Search
    CPC .......... H04R 2201/021; H04R 2400/01; H04R
                2420/07; H04R 1/028; H04R 23/008;
                H04W 64/00; B06B 1/04; G10K 15/04
    See application file for complete search history.

(56)                    References Cited

U.S. PATENT DOCUMENTS

| | | | |
|---|---|---|---|
| 2009/0272191 A1 | 11/2009 | Maris et al. | |
| 2009/0295639 A1 | 12/2009 | Zhao et al. | |
| 2015/0247916 A1 | 9/2015 | Bartov et al. | |
| 2016/0077192 A1 | 3/2016 | Calvarese et al. | |
| 2017/0242096 A1* | 8/2017 | Okano | A61B 5/0095 |
| 2017/0276768 A1 | 9/2017 | Wulff | |
| 2018/0356520 A1 | 12/2018 | Booij et al. | |
| 2019/0326989 A1 | 10/2019 | McElveen | |
| 2023/0236318 A1* | 7/2023 | Shintani | G01S 3/8006 |
| | | | 367/128 |
| 2024/0012094 A1* | 1/2024 | Davis | G01S 5/30 |

FOREIGN PATENT DOCUMENTS

| | | | | | |
|---|---|---|---|---|---|
| CN | 109511068 A | | 3/2019 | | |
| CN | 113295933 A | * | 8/2021 | ......... | G01R 29/0842 |
| EP | 1746477 A2 | | 1/2007 | | |
| GB | 2597656 A | * | 2/2022 | .......... | H04R 23/008 |
| JP | 2023015217 A | * | 1/2023 | | |
| SE | 1850083 A1 | | 8/2019 | | |

| | | | | | |
|---|---|---|---|---|---|
| WO | WO 2013/132393 A1 | | 9/2013 | | |
| WO | WO 2013/181247 A1 | | 12/2013 | | |
| WO | WO 2014/176033 A1 | | 10/2014 | | |
| WO | WO 2016/033110 A1 | | 3/2016 | | |
| WO | WO 2017/155634 A1 | | 9/2017 | | |
| WO | WO-2022018324 A1 | * | 1/2022 | .......... | H04R 23/008 |

OTHER PUBLICATIONS

Translation of JP2023015217 (Year: 2022).*
Azizyan et al., "Surroundsense: Mobile Phone Localization Using Ambient Sound and Light", Mobile Computing and Communications Review, vol. 13, No. 1, (Jan. 2009), 4 pages.
International Search Report and Written Opinion for Patent Cooperation Treaty Application No. PCT/FI2021/050524 dated Nov. 11, 2021, 17 pages.
Nikitichev et al., "Music-Of-Light Stethoscope: A Demonstration Of The Photoacoustic Effect", Physics Education, vol. 51, (Jul. 2016), 9 pages.
Rahman et al, "Recent Advances in Indoor Localization via Visible Lights: A Survey", Sensors 2020, 20, (Mar. 3, 2020), 26 pages.
Search Report for United Kingdom Application No. GB2011252.0 dated Jan. 8, 2021, 3 pages.
Yamabe et al., "Sound Generation Using Photoacoustic Effect", Proceedings of Meetings on Acoustics, vol. 19, (Jun. 2, 2013), 7 pages.
Zhu et al., "Hearing Light From An Incandescent Bulb", European Journal of Physics, vol. 36, (Nov. 3, 2014), 9 pages.

* cited by examiner

APPARATUSES, METHODS AND COMPUTER PROGRAMS FOR LOCATING MOBILE DEVICES BY USING PHOTOACOUSTICALLY-GENERATED AUDIO SIGNALS

CROSS-REFERENCE TO RELATED APPLICATIONS

This application is a national phase entry of International Application No. PCT/FI2021/050524, filed Jul. 6, 2021, which claims priority to Great Britain Application No. 2011252.0, filed Jul. 21, 2020, the contents of which are hereby incorporated by reference in their entirety.

TECHNOLOGICAL FIELD

Examples of the disclosure relate to apparatus, methods and computer programs for locating mobile devices. Some relate to apparatus, methods and computer programs for locating mobile devices in indoor locations.

BACKGROUND

Systems for locating mobile devices can be used in a variety of applications such as communications or for tracking mobile devices as they move through a warehouse or factory or any other applications in which it is useful to know the position of a mobile device.

BRIEF SUMMARY

According to various, but not necessarily all, examples of the disclosure there is provided an apparatus comprising means for: obtaining a time of arrival of at least one audio signal at a mobile device, wherein the audio signal is generated with a photoacoustic effect; and using the time of the arrival of the audio signal to estimate a location of the mobile device.

The audio signal may be generated with a photoacoustic effect by a light source at a known location.

The light source may comprise a coating of photoacoustic material provided, at least partially, around the light source.

The light source may be coupled to a modulator for modulating intensity of light emitted by the light source.

The audio signal may comprise a predetermined waveform.

The audio signal may have a frequency outside a threshold of human hearing.

The means may also be for detecting a light signal wherein the light signal is generated from the light source that also generates the audio signal.

The means may also be for using the light signal to synchronise timing between the apparatus and the light source.

The means may also be for obtaining the time of arrival of a plurality of audio signals at a mobile device, wherein the plurality of audio signals are generated from a plurality of light sources using the photoacoustic effect at a plurality of known locations.

The plurality of light sources may be synchronised over a network.

According to various, but not necessarily all, examples of the disclosure there is provided an imaging device comprising at least one processor; and at least one memory including computer program code, the at least one memory and the computer program code configured to, with the at least one processor, cause the apparatus at least to perform: obtaining a time of arrival of at least one audio signal at a mobile device, wherein the audio signal is generated with a photoacoustic effect; and using the time of arrival of the audio signal to estimate a location of the mobile device.

According to various, but not necessarily all, examples of the disclosure there is provided a method comprising: obtaining a time of arrival of at least one audio signal at a mobile device, wherein the audio signal is generated with a photoacoustic effect; and using the time of arrival of the audio signal to estimate a location of the mobile device.

According to various, but not necessarily all, examples of the disclosure there is provided a computer program comprising computer program instructions that, when executed by processing circuitry, cause: obtaining a time of arrival of at least one audio signal at a mobile device, wherein the audio signal is generated with a photoacoustic effect; and using the time of arrival of the audio signal to estimate a location of the mobile device.

According to various, but not necessarily all, examples of the disclosure there is provided a mobile apparatus comprising means for: detecting an audio signal wherein the audio signal is generated with a photoacoustic effect at a known location; and enabling the detected audio signal to be used to estimate a location of the mobile apparatus.

According to various, but not necessarily all, examples of the disclosure there is provided a light source apparatus comprising; a light source configured to generate a light signal; a modulator configured to modulate intensity of light emitted by the light source; and a coating of photoacoustic material provided, at least partially, around the light source so that audio signal generated using the photoacoustic material can be used to estimate the location of a mobile apparatus.

The modulator may be configured to control the intensity of light emitted by the light source so that the audio signal generated using the photoacoustic material comprises a predetermined waveform.

The waveform may have a frequency outside threshold of human hearing.

The audio signal may comprise an audio pulse.

According to various, but not necessarily all, examples of the disclosure there is provided a light source apparatus is synchronised with one or more other light source apparatus.

According to various, but not necessarily all, examples of the disclosure there is provided a system comprising a plurality of light source apparatus as described.

The system may comprise means for: obtaining a time of arrival of a plurality of audio signals at a mobile device, wherein the audio signals is generated from the plurality light source apparatus with the photoacoustic effect at a plurality of known locations; and using the time of arrival of the plurality of audio signals to estimate a location of the mobile device.

BRIEF DESCRIPTION

Some examples will now be described with reference to the accompanying drawings in which.

DETAILED DESCRIPTION

Figure 1:
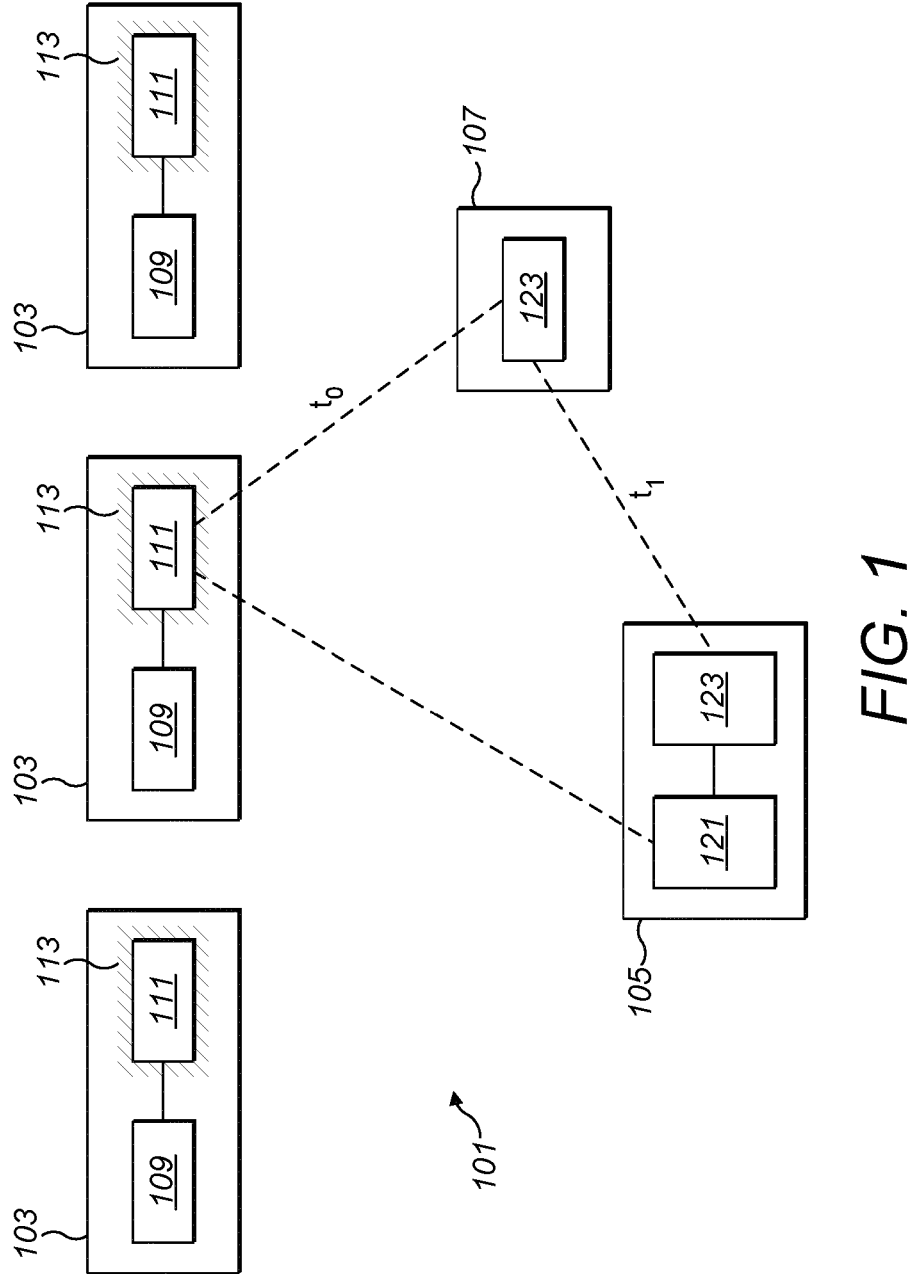
FIG. 1 shows an example system.

Examples of the disclosure relate to systems 101 that enable locations of mobile devices 105 to be estimated. FIG. 1 schematically shows an example system 101 that can be used to implement examples of the disclosure. The system 101 shown in FIG. 1 comprises a plurality of light source apparatus 103, one or more mobile devices 105 and a processing device 107. It is to be appreciated that in some implementations the systems 101 could comprise additional components that are not shown in FIG. 1.

The light source apparatus 103 can comprise any apparatus that are configured to generate an audio signal 131 with a photoacoustic effect. In the example shown in FIG. 1 the light source apparatus 103 comprise a light source 111 and a coating of photoacoustic material 113 provided, at least partially, around the light source 111.

The light source 111 can be a light bulb, a light emitting diode, a halogen lamp or any other suitable means for generating light. The light generated by the light source 111 can comprise electromagnetic radiation in the visible portion of the spectrum. For instance, the light source 111 can generate light with a wavelength between 400 nm and 700 nm. In some examples the light source 111 can generate light outside of the visible portion of the spectrum, for example the light source could generate infra-red or ultra-violet light.

The light from the light source 111 can be used to provide illumination for the area in which the system 101 is located. For example, the light sources 111 can provide visible light that can illuminate a room or other environment. This could enable the light source apparatus 111 to provide dual functionality of enabling the estimate of the locations of the mobile devices 105 and also illuminating the area of the system 101.

A coating of photoacoustic material 113 is provided around the light source 111 so that at least some of the light generated by the light source 111 is incident on the photoacoustic material 113. The photoacoustic material 113 can comprise any optically absorptive material that can generate an audio signal 131 when light is incident on it. The photoacoustic material 113 can comprise a black material such as charcoal or a stored sample of a greenhouse gas or any other suitable type of material.

When the light source apparatus 103 is in use the light source 111 generates light and the photoacoustic material 113 is heated by the incident light from the light source 111. This heating causes expansion of the air around the photoacoustic material 113 which generates the audio signal 113. The audio signal 131 comprises a pressure wave that is transmitted through the air or any other suitable medium. In some examples the audio signal 131 could have a frequency that is outside of the range of normal human hearing. For example, the audio signal 131 could have a frequency in the range 20 kHz to 24 kHz.

In the example shown in FIG. 1 the light source apparatus 103 also comprises a modulator 109. The modulator 109 comprises means for modulating the intensity of light emitted by the light source 111. The modulator 109 can apply a predetermined waveform to the intensity of the light emitted by the light source 111. The applied waveforms can comprise any suitable waveforms that can be used to generate an audio signal. In some examples the waveforms could comprise sine waves, short pulses, or any other suitable types of waveforms. The waveforms that can be used can be stored in a memory that is accessible by the modulator 109.

The modulator 109 can be configured to control the power provided to the light source 111 in accordance with the predetermined waveform. This controls the intensity of light emitted by the light source 111 and so in turn controls the heating of the photoacoustic material 113 caused by the light. This enables an audio signal 131 with a predefined waveform to be generated by the light source apparatus 103.

In examples of the disclosure the light source apparatus 103 has a known position within the system 101. In some examples the light source apparatus 103 could have a fixed position. For example, it can be fixed to a ceiling or wall. In other examples the light source apparatus 103 could be moveable but the position of the light source could be determined by any suitable positioning means so that the location of the mobile devices 105 can be estimated from this known location.

In the example shown in FIG. 1 the system 101 comprises a plurality of light source apparatus 103. The plurality of light source apparatus 103 are positioned at different known locations within the area covered by the system 101. The plurality of light source apparatus 103 each comprise a light source 111 and photoacoustic material 113 as described above. In the example shown in FIG. 1 each of the light source apparatus 103 each comprise a modulator 109 that is configured to modulate each of the individual light sources 111. In some examples a central modulator 109 could be configured to modulate a plurality of the light sources 111.

Where the system comprises a plurality of light source apparatus 103 the plurality of light source apparatus 103 can synchronized so that the timing of audio signals 131 generated by the light source apparatus 103 are emitted at known times. In some examples the audio signals 131 can be emitted at the same time from each of the light source apparatus 103. In other examples the audio signals 131 can be emitted at predetermined intervals.

The plurality of light source apparatus 103 can be synchronized using any suitable means. For instance, the light source apparatus 103 can be part of a wired or wireless communications network.

The system 101 shown in FIG. 1 also comprises a mobile device 105. Only one mobile device 105 is shown in FIG. 1 however it is to be appreciated that any number of mobile devices could be provided within the system 101 in other examples of the disclosure.

The mobile device 105 can be any device that can move within the area covered by the system 101. In some examples the mobile device 105 could be a personal communications device such as a mobile phone or a wearable device such as a smart watch. In other examples the mobile devices 105 could be tags or other identifiers that can be attached to objects. For example, tracking devices could be attached to objects in a factory or warehouse and used to monitor the positions of the objects as they move through the factory or warehouse. In some examples the mobile devices 105 could comprise wearable devices such as jackets or hats that comprise circuitry, such as the circuitry shown in FIG. 1, that enables the wearable device to be located using examples of the disclosure. This could enable a person wearing such mobile devices 105 to be located.

In the example shown in FIG. 1 the mobile device 105 comprises an audio sensor 121 and a processor 123. It is to be appreciated that only the components relevant for this disclosure are shown in FIG. 1 and that the mobile device 105 would also comprise additional components that are not shown in FIG. 1. For instance, the mobile device 105 could comprise transceiver circuitry that enables the mobile device to communicate in a wireless network.

The audio sensor 121 comprises any means that can be configured to sense the audio signal 131. The audio sensor 121 can comprise one or more microphones. The audio sensor 121 can be configured to sense the audio signal 131 and provide an electrical output signal in response to the detection of the audio signal 131.

The audio sensor 121 is coupled to the processor 123 so that the output of the audio sensor 121 is provided to the processor 123. The processor 123 can be configured to analyse the output signal from the audio sensor 121 to determine whether or not the sensed audio signal 131 corresponds to the predetermined waveform. If it is determined that the audio signal 131 has the predetermined waveform then it can be determined to be an audio signal from one of the light source apparatus 105. The processor 123 is configured to estimate the time of arrival of the audio signal 131 and enable this to be used to estimate the location of the mobile device 105.

In the example shown in FIG. 1 the system 101 comprises a processing device 107. The processing device 107 is configured to use the estimated time of arrival of the audio signal 131 at the mobile device 105 to estimate a position of the mobile device 105. The processing device 107 comprises a processor 123 that can be configured to perform the processing to estimate the position of the mobile device 105. It is to be appreciated that the processing device 107 could also comprise additional components that are not shown in FIG. 1 such as transceiver circuitry for enabling communication with the other components of the system 101.

In the example shown in FIG. 1 the processing device 107 is provided separately to both the mobile device 105 and the light source apparatus 103. In this example the processing device 107 is a separate device that can communicate with the mobile device 105 and the light source apparatus 103 using a communication network. This can enable the mobile device 105 to provide information, such as the time of arrival of an audio signal 131 at the mobile device 105, to the processing device 107.

The processing device 107 can also be configured to determine the time that the light was emitted by the light source 111. In some examples the processing device 107 can comprise a light sensor that can be configured to detect the modulation of light from the light source 111. As the speed of light is so much faster than the speed of sound the modulation of the light can be detected instantaneously. This enables the processing device to determine to as the time at which the light is detected. In other examples the light sources 111 could be synchronized and the timings used for this synchronization could be provided to the processing device 107 via a communications network or any other suitable means. In such cases the processing device 107 could use this received information to determine $t_0$.

Once the processing device has determined to the timing of the audio signals can then be measured as a delay relative to $t_0$.

For instance, if the audio signal 131 is received at time $t_1$ then the distance d between the light source apparatus 103 and the mobile device 105 is given by $$d = c(t_1 - t_0)$$

where c is the speed of sound for the audio signal. The speed of sound for the audio signal can be adjusted to take into account parameters such as temperature and humidity.

In the example shown in FIG. 1 only one audio signal 131 from one light source apparatus 103 is shown. It is to be appreciated that in other examples a plurality of audio signals 131 from a plurality of different light source apparatus 103 could be used. This can enable a more accurate location for the mobile device 103 to be determined. Any suitable processes, such as multilateration algorithms, can be used to estimate the position of the mobile device 105.

It is to be appreciated that variations of the system 101 shown in FIG. 1 could be used in other examples of the disclosure. For instance, in other examples the processor 123 of the mobile device 105 could be configured to estimate a position of the mobile device 105. In such examples the processing device 107 might not be needed as the relevant processing could be performed by the processor 123 of the mobile device 105.

In other examples one or more of the light source apparatus 103 could be configured to perform the processing for estimating the location of the mobile device 105. In such examples one or more of the light source apparatus 103 could be configured to communicate with the mobile device 105 and enable the light source apparatus 103 to obtain the information relating to the timing of the receipt of the audio signals 131. This information can then be used to estimate the position of the mobile device 105.

Figure 2:
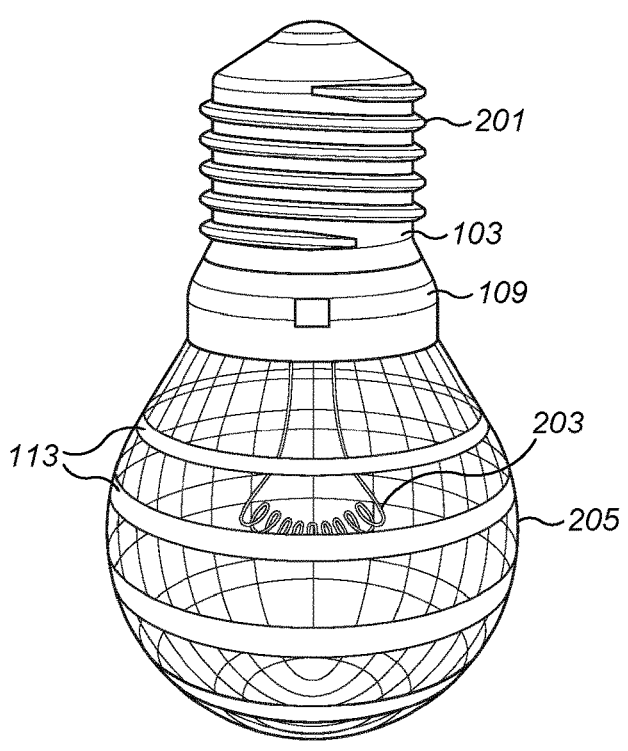
FIG. 2 shows an example light source apparatus.

FIG. 2 shows an example light source apparatus 103 that can be used in some examples of the disclosure.

In this example the light source apparatus 103 comprises a light bulb 201. The light bulb 201 comprises a filament 203 that provides a light source 111 when a current is passed through it. In other examples means such as an LED, or any other suitable means, could be provided instead of the filament 203.

The filament 203 is provided within a casing 205 of the light bulb 201. The casing 205 can be formed from glass or any other suitable material. The casing 205 is transparent to enable the light generated by the light source 111 to pass through the casing 205.

A coating of photoacoustic material 113 is provided on the casing 205 of the light bulb 201. The photoacoustic material 113 can comprise charcoal or any other suitable 30 material.

The photoacoustic material 113 is provided on the casing 205 of the light bulb 201 so that light emitted from the light source 111 is incident on the photoacoustic material 113 and can be absorbed by the photoacoustic material 113.

The photoacoustic material 113 is provided to partially cover the casing 205 of the light bulb so that only part of the light emitted by the light source 111 is absorbed by the photoacoustic material 113. The light that is not incident on the photoacoustic material 113 can be emitted through the casing 205. This can enable the light that is not absorbed by the photoacoustic material 113 to be used to illuminate the area in which the system 101 is located. The amount of photoacoustic material 113 that is provided on the casing 205 of the light bulb 201 can be selected so that there is enough photoacoustic material 113 to enable a detectable audio signal to be produced but avoids too much light being absorbed so that a user does not notice any fluctuation in light levels.

The photoacoustic material 113 generates sound via the photoacoustic effect in accordance with the following equation:

$$p = \frac{\beta}{\kappa \rho C_v} A_e$$

Where p is the acoustic pressure generated, $\kappa$ is the compressibility of the absorptive material sample, $\rho$ is the absorptive material density, $C_v$ is the specific heat capacity of the absorptive material at constant volume, $\beta$ is the thermal expansion coefficient of the absorptive material and $A_e$ is the optical energy absorbed per unit volume.

The rest of the optical energy that is not absorbed by the photoacoustic material 113 propagates through the casing 205 and into the surrounding environment to provide light for the area around the light source apparatus 103.

In the example shown in FIG. 2 the photoacoustic material 113 is provided in a plurality of bands around the casing 205 of the bulb 201. Spacings are provided between the bands to enable light to pass through the casing 205. Other patterns for the photoacoustic material 113 could be used in other examples of the disclosure.

In the example shown in FIG. 2 the photoacoustic material 113 is provided in a symmetric pattern so that the audio signal 131 generated by the photoacoustic material 113 is emitted equally in all directions. In other examples an asymmetric pattern could be used.

The light source apparatus 103 also compares a modulator 109. The modulator 109 can comprise any circuitry that enables the intensity of the light emitted by the light source 111 to be controlled. The modulator 109 can comprise memory circuitry for storing predetermined waveforms that can be used to modulate the intensity of light emitted by the light sources. In some examples the modulator 109 can comprise timing circuitry which is configured to enable the timing of the modulations to be synchronized with one or more other light source apparatus 103.

In the example shown in FIG. 2 the modulator 109 is provided around the base of the light bulb 201. This can enable the light bulb 201 to be used in standard light fittings without any modification to the light fittings or the other circuitry coupled to the light fittings.

Figure 3:
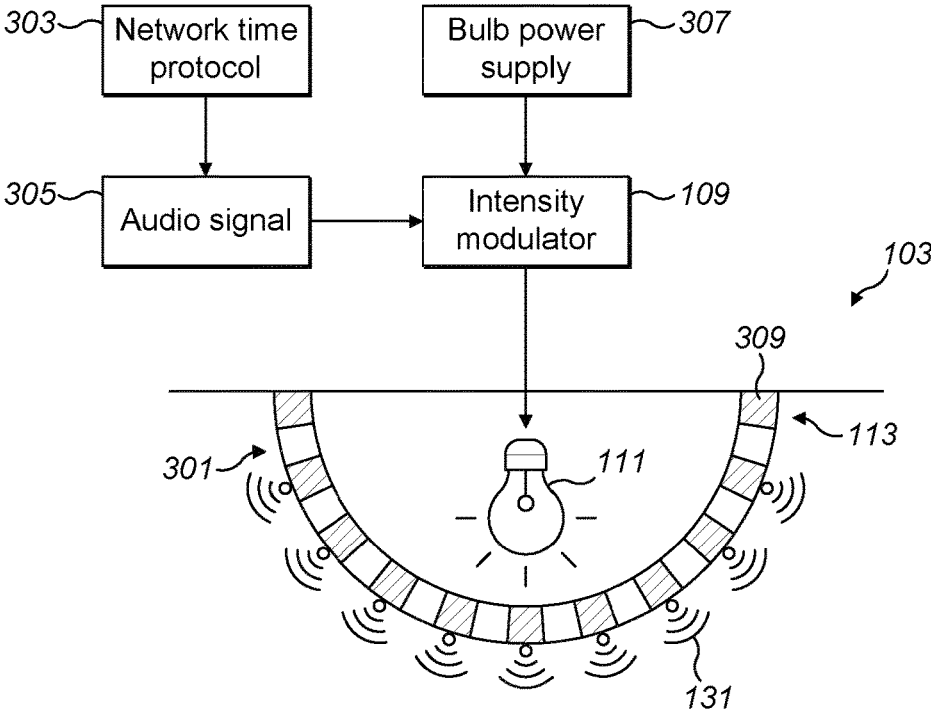
FIG. 3 shows an example light source apparatus.

FIG. 3 shows a cross section of another example light source apparatus 103 that could be used in examples of the disclosure.

In this example the photoacoustic material 113 is provided on a cover 309 of a light fitting. The light source apparatus 103 comprises a light source 111. The light source 111 could be a bulb, one or more light emitting diodes or any other suitable type of light source 111. The light source 111 in this example could be a standard bulb or light emitting diode arrangement that has not been modified specifically for use in this system 111 because the photoacoustic material 113 is provided on the cover 309 of the light fitting rather than on the light source 111 itself.

In the example shown in FIG. 3 the cover 309 is provided around the light source 111. The cover 309 comprises alternating portions of an optically transparent material 301 and a photoacoustic material 113. The portions of optically transparent material 301 and photoacoustic material 113 could be provided in a checkerboard arrangement or any other suitable pattern. The photoacoustic material 113 can comprise charcoal or any other suitable material. In the example shown in FIG. 3 the photoacoustic material 113 is provided as part of the cover 309 so that the photoacoustic material 113 extends through the thickness of the cover 309. In other examples the photoacoustic material 113 could be provided as a coating on the surface of portions of the cover 309.

The optically transparent material 301 can comprise any material that enables light generated by the light source 111 to pass through the cover 309. The optically transparent material can comprise glass, plastics or any other suitable type of material.

The light source 111 is coupled to circuitry that controls the intensity of the light emitted by the light source 111. In the example shown in FIG. 3 this circuitry is provided separate to the light source 111. For example, the circuitry can be provided as part of a communications network that can be used to control a plurality of light sources 111. For example, the circuitry could be part of an internet of things or any other suitable network. This can also enable a standard light source 111 to be used within the system 101.

In the example shown in FIG. 3 the circuitry comprises a timing module 303. In this example the timing module 303 can be configured to receive clock information from a network. The clock information can enable a plurality of light source apparatus 103 to be synchronized. The clock information can enable the audio signals generated by the light source apparatus 103 to be emitted at predetermined times.

The circuitry also comprises an audio signal module 305. The audio signal module 305 can comprise information relating to the waveform that is to be applied to the audio signal. For example, the audio signal module 305 can store information relating to a predetermined waveform that is to be applied to the audio signal 131 at the predetermined times.

The circuitry also comprises a power supply 307. In some examples the power supply 307 can comprise a mains power supply that can be connected to the light source 111. Other types of power supplies, such as batteries, could be used in other examples of the disclosure.

The modulator 109 is configured to control the intensity of the power supplied to the light source 111. The modulator 109 controls the intensity of the power supplied so that a modulated light signal is provided from the light source 111 which in turn provides a modulated audio signal 131 from the photoacoustic material 113.

The modulator 109 uses timing information from the timing module 303 to ensure that the modulated light signal is provided at a predetermined time. The modulator 109 uses audio signal information from the audio signal module 305 to ensure that the modulated light signal, and corresponding audio signal, comprise the predetermined waveform. The audio signal could comprise a sequence of ultrasonic chirps or any other suitable audio signals.

Figure 4:
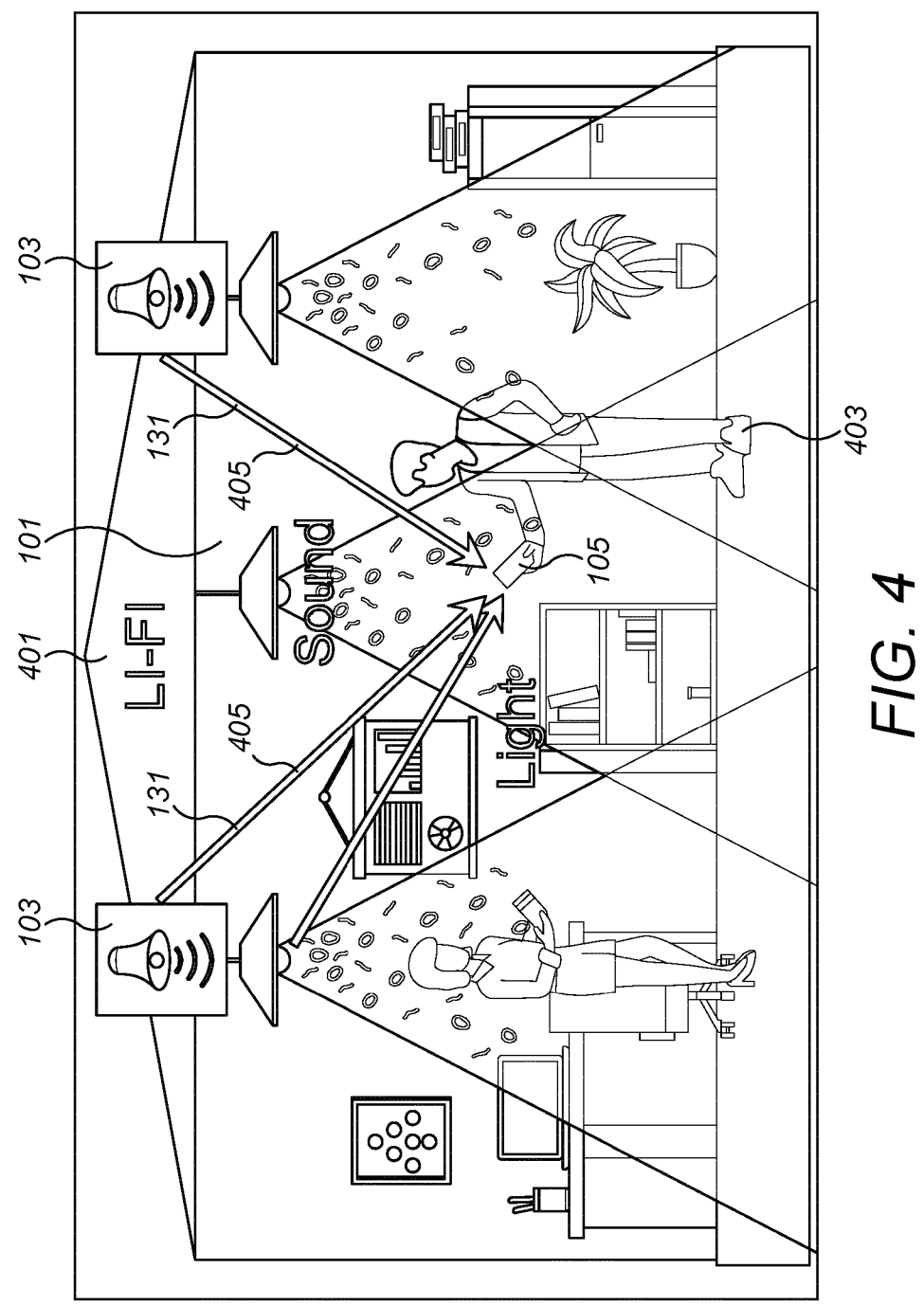
FIG. 4 shows an example of the disclosure in use.

FIG. 4 shows an example system 101 in use. The example system 101 comprises a plurality of light source apparatus 103 that comprise photoacoustic material 113 for generating an audio signal 131 from a light source 111. The plurality of light source apparatus 103 can be as shown in FIG. 2 or 3 or could be any other suitable type of light source apparatus 103.

In FIG. 4 the plurality of light source apparatus 103 are provided within a room or other indoor environment. The plurality of light source apparatus 103 are configured to provide illumination of the room or other indoor environment.

The plurality of light source apparatus 103 are positioned at different locations within the room. In the example shown in FIG. 4 the positions of the light source apparatus 103 can be fixed, known positions. In the example shown in FIG. 4 the plurality of light source apparatus 103 are provided on the ceiling of the room. In other examples the plurality of light source apparatus 103 could be provided on the walls or in any other suitable location.

The plurality of light source apparatus 103 are connected to a network 401. The network can comprise a Li-Fi network or any suitable type of network that enables the plurality of light source apparatus 103 to be synchronized.

The network 401 can also comprise one or more modulators 109 configured to control the modulation of the light sources 111 within the plurality of light source apparatus 103. The modulators 109 can be configured to control the modulation of the light sources 111 at defined times and frequencies. The modulation of the light sources can be controlled so that it would not be perceived by users 403 within the area.

The modulators 109 can control the modulation of light so that it can be determined which light source apparatus 103 a modulated light signal and/or modulated audio signal 131 originates from. In some examples the modulators 109 can control the plurality of light source apparatus 103 so that different light signals are modulated at different times. In some examples the modulators 109 can control the plurality of light source apparatus 103 so that different light signals are modulated with different frequencies.

In the example shown in FIG. 4 a user 403 is in the indoor area covered by the system 101. The user 403 is using their mobile device 105 which in this example is a mobile phone. Other types of mobile devices 105 could be used in other examples of the disclosure.

The mobile device 105 can be connected to the same network 401 as the plurality of light source apparatus 103. This can enable the mobile device 105 to be synchronized in time with the plurality of light source apparatus 103.

The system 101 can enable the location of the mobile device 105 to be determined. The audio signals 131 from the plurality of light source apparatus 103 can be detected by an audio sensor 121 in the mobile device 105. The time of arrival of the audio signal 131 at the mobile device 105 can be recorded. As the mobile device 105 is part of the same network 401 as the plurality of light source apparatus 103 the time that the audio signal 131 was emitted by the light source apparatus 103 is known. The distance between the mobile device 105 and the light source apparatus 103 that emitted the detected audio signal 131 can be determined based on the speed of sound. This process can be repeated for a plurality of audio signals 131 from a plurality of different light source apparatus 103. A process such as multilateration can be used to estimate the position of the mobile device based on the distance measurements.

In some other examples the mobile device 105 might not be connected to the same network 401 as the light source apparatus 103. In such examples the light signal 405 emitted by the light source apparatus 103 could be used to synchronize the mobile device 105 with the light source apparatus 103. The speed of light is such that, for the purposes of estimating the location of the mobile device 105, the light signal can be considered to be propagated to the mobile device 105 instantaneously.

This system 101 shown in FIG. 4 therefore enables the location of mobile devices 105 and the users of mobile devices 105 to be located. This can be useful for communication purposes or for any other suitable purposes.

Figure 5:
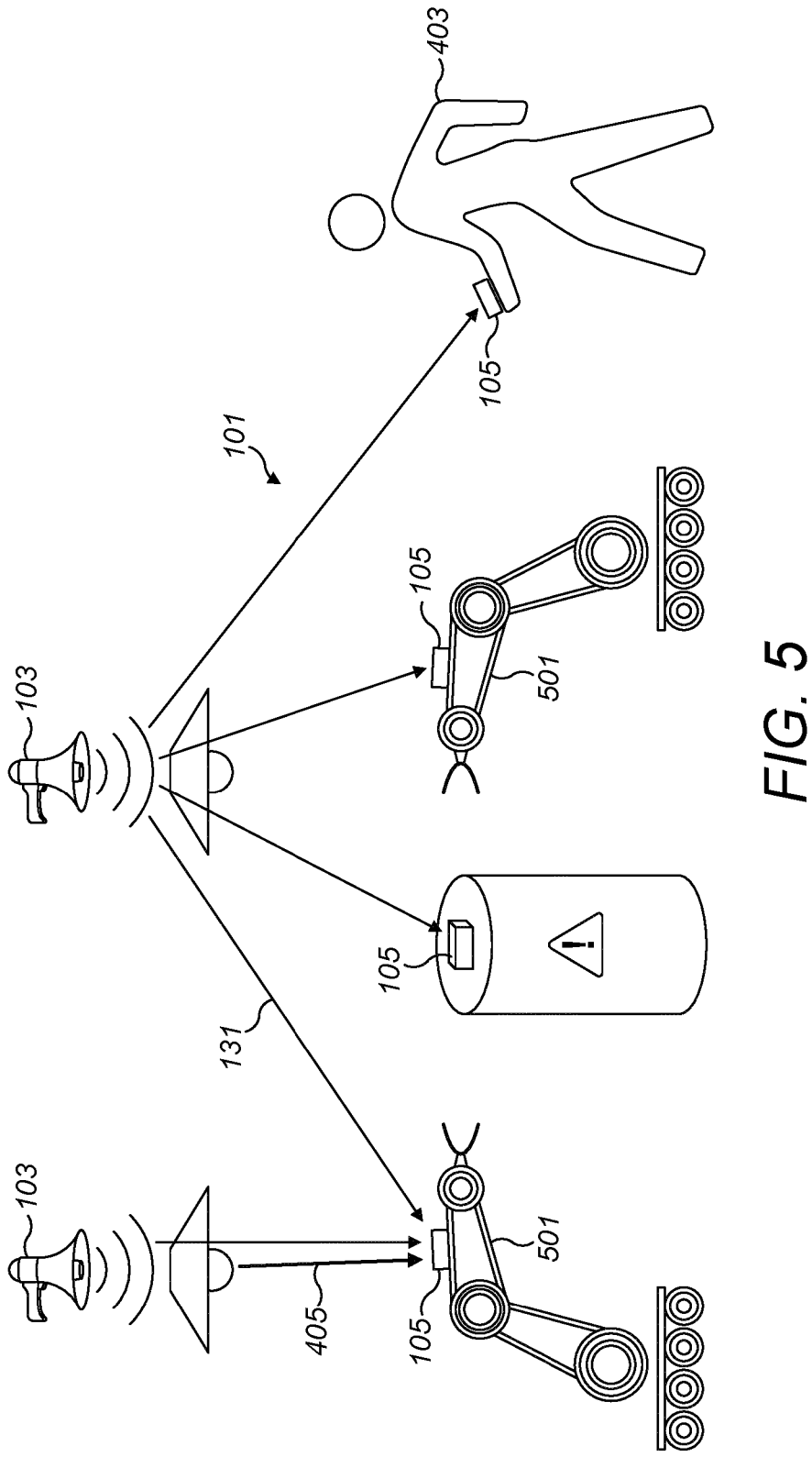
FIG. 5 shows an example of the disclosure in use.

FIG. 5 shows another example system 101 in use. This system could be used in a factory or warehouse or another suitable environment. The system could enable items to be tracked within a warehouse or factory.

The example system 101 comprises a plurality of light source apparatus 103 that comprise photoacoustic material 113 for generating an audio signal 131 from a light source 111. The plurality of light source apparatus 103 can be as shown in FIG. 2 or 3 or could be any other suitable type of light source apparatus 103.

In FIG. 5 the plurality of light source apparatus 103 can be configured to provide illumination of the warehouse or factory.

In this example the mobile devices 105 comprise items that are moving through the warehouse or factory. Audio sensors 121 can be attached to the items to enable the audio signals 131 to be detected. In some examples the mobile devices 105 can also comprise communication circuitry that can enable information to be transmitted from the mobile device 105 to a network. For example, information relating to the time of arrival of an audio signal could be transmitted. Or in some examples the mobile device 105 can be configured to estimate its own location and provide this estimate to a network.

In some sections the mobile device 105 can be moved autonomously, for example the mobile devices 105 can be positioned on conveyor belts 501 or could be moved by robotic arms or by any other suitable means. When the mobile devices 105 are being moved autonomously they are being moved without any input from a human user 403. In such examples the location estimates obtained from the system 101 can be used to control the conveyor belts 501 or robotic arms to move the mobile devices 105.

In some sections the mobile device 105 could also be moved manually by one or more users 403. In such sections a user 403 could pick up the mobile device 105 and move it to another location. In such examples the positioning system 101 can be used to track the locations of the various mobile items.

In the system 101 shown in FIG. 5 both manual and autonomous movement of the mobile devices 105 is used. It is to be appreciated that in other examples the movement of the mobile deices 105 could be just autonomous or just manual.

Figure 6:
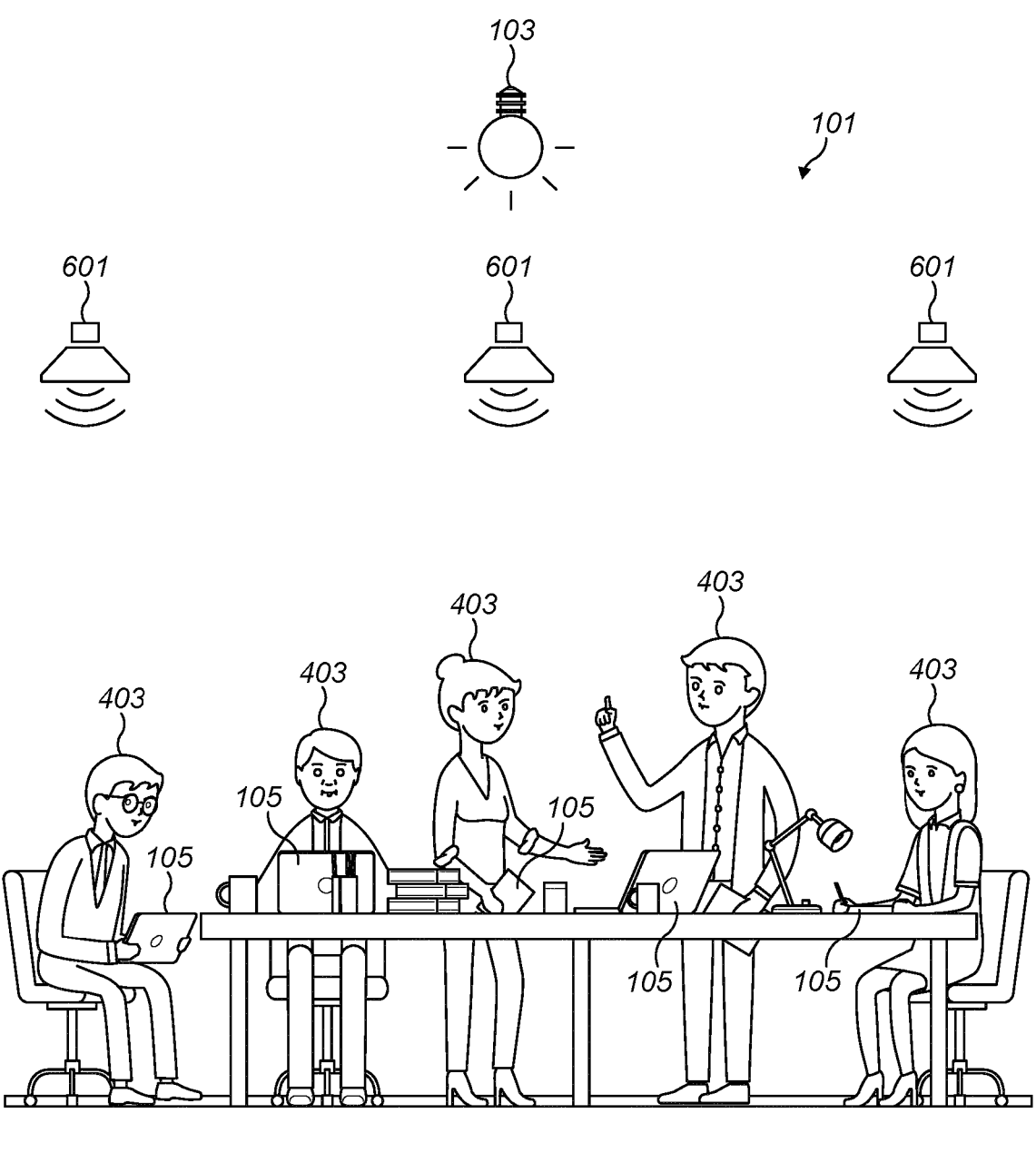
FIG. 6 shows an example of the disclosure in use.

FIG. 6 shows another example system 101 in use. This system 101 could be used for improving a conferencing service. In the example shown in FIG. 6 the system 101 comprises one light source apparatus 103. It is to be appreciated that a plurality of light source apparatus 103 could be used in other examples of the system 101.

In this example the system 101 also comprises a plurality of audio transducers 601. The audio transducers 601 can comprise one or more microphones that can be configured to detect audio signals from the users 403 of the system 101. For example, the microphones can be configured to detect speech or other sounds from the users 403. The audio transducers 601 could also comprise one or more speakers that are configured to provide audio signals for the users 403. For instance, sounds recorded at another location could be transmitted to the system 101 via a communications network and played back to the users 403 using the speakers.

In this example of the disclosure the light source apparatus 103 can be configured so that the audio signal generated by the photoacoustic material 113 is outside of the audible range. This can prevent the audio signal generated by the photoacoustic material 113 from interrupting the user's 403 speaking or any other audio that might be played back by the audio transducers.

In the example shown in FIG. 6 a plurality of users 403 are using the conferencing. Each of the user's has a mobile device 105 such as a laptop, mobile phone or tablet computer. The positioning system 101 can be used to estimate the position of the mobile devices 105 belonging to each of the users and use that to determine the location of the various users 403 in the room.

Once the location of the various users 403 has been estimated this can be used to control the audio transducers 601. For instance, if it is determined that a first user 403 in a first location is talking then the gains of the audio transducers 601 can be controlled so that the first user 403 is heard louder than the other users. For example, larger gains could be provided for the microphones closest to the user

401 who is currently speaking. As the other users in the room would be recorded more quietly this could reduce interruptions from background noise caused by the other users 403 in the room.

Figure 7:
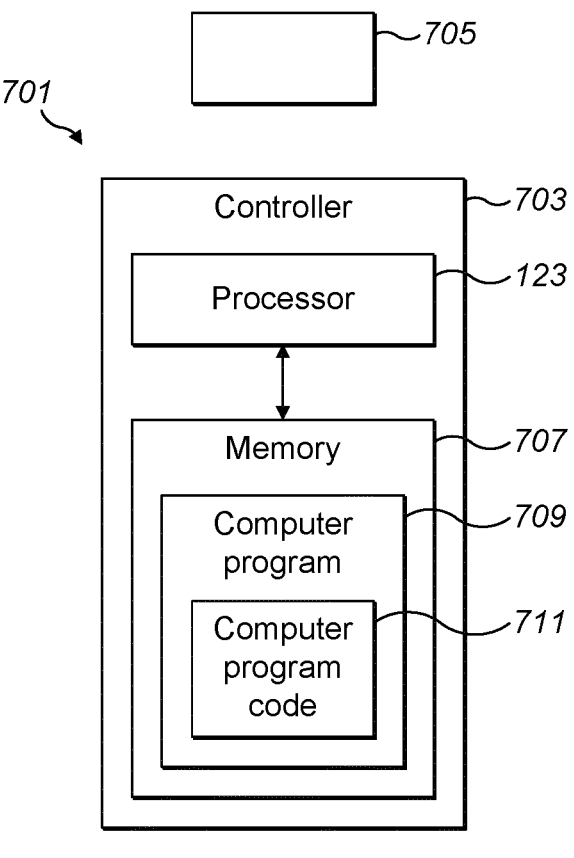
FIG. 7 shows an example apparatus.

FIG. 7 schematically illustrates an apparatus 701 according to examples of the disclosure. The apparatus 701 illustrated in FIG. 7 may be a chip or a chip-set. In some examples the apparatus 701 may be provided within devices such as a mobile device 101 or a processing device 107 within the system 101 as shown in FIG. 1 or any other suitable device.

In the example of FIG. 7 the apparatus 701 comprises a controller 703. In the example of FIG. 7 the implementation of the controller 703 may be as controller circuitry. In some examples the controller 703 may be implemented in hardware alone, have certain aspects in software including firmware alone or can be a combination of hardware and software (including firmware).

As illustrated in FIG. 7 the controller 703 may be implemented using instructions that enable hardware functionality, for example, by using executable instructions of a computer program 709 in a general-purpose or special-purpose processor 123 that may be stored on a computer readable storage medium (disk, memory etc.) to be executed by such a processor 123.

The processor 123 is configured to read from and write to the memory 707. The processor 123 may also comprise an output interface via which data and/or commands are output by the processor 123 and an input interface via which data and/or commands are input to the processor 123.

The memory 707 is configured to store a computer program 709 comprising computer program instructions (computer program code 711) that controls the operation of the apparatus 701 when loaded into the processor 123. The computer program instructions, of the computer program 709, provide the logic and routines that enables the apparatus 701 to perform methods such as the method illustrated in FIG. 8. The processor 123 by reading the memory 707 is able to load and execute the computer program 709.

The apparatus 701 therefore comprises means for: obtaining a time of arrival of at least one audio signal 131 at a mobile device 105, wherein the audio signal 131 is generated with a photoacoustic effect; and using the time of the arrival of the audio signal 131 to estimate a location of the mobile device 105.

As illustrated in FIG. 7 the computer program 709 may arrive at the apparatus 701 via any suitable delivery mechanism 705. The delivery mechanism 705 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 709. The delivery mechanism may be a signal configured to reliably transfer the computer program 709. The apparatus 701 may propagate or transmit the computer program 709 as a computer data signal. In some examples the computer program 709 may be transmitted to the apparatus 701 using a wireless protocol such as Bluetooth, Bluetooth Low Energy, Bluetooth Smart, 6LoWPan (IP$_v$6 over low power personal area networks) ZigBee, ANT+, near field communication (NFC), Radio frequency identification, wireless local area network (wireless LAN) or any other suitable protocol.

The computer program 709 comprises computer program instructions for causing an apparatus 701 to perform at least the following: obtaining a time of arrival of at least one audio signal 131 at a mobile device 105, wherein the audio signal 131 is generated with a photoacoustic effect; and using the time of arrival of the audio signal 131 to estimate a location of the mobile device 105.

The computer program instructions may be comprised in a computer program 709, a non-transitory computer readable medium, a computer program product, a machine readable medium. In some but not necessarily all examples, the computer program instructions may be distributed over more than one computer program 709.

Although the memory 707 is illustrated as a single component/circuitry it may be implemented as one or more separate components/circuitry some or all of which may be integrated/removable and/or may provide permanent/semi-permanent/dynamic/cached storage.

Although the processor 123 is illustrated as a single component/circuitry it may be implemented as one or more separate components/circuitry some or all of which may be integrated/removable. The processor 123 may be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Figure 8:
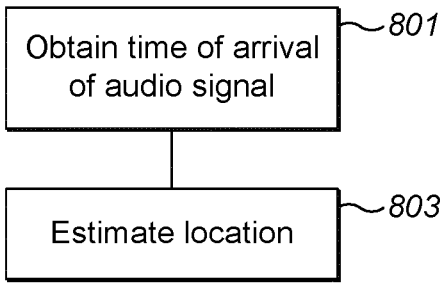
FIG. 8 shows an example method.

FIG. 8 illustrates an example method. The method could be implemented using an apparatus 701 as shown in FIG. 7. The apparatus 701 could be provided within a mobile device 105 or within a processing device 107 or within any other suitable device within the system 101 as shown in FIG. 1.

The method comprises, at block 801, obtaining a time of arrival of at least one audio signal 131 at a mobile device 105. The audio signal 131 is with a photoacoustic effect. The audio signal can be generated by a light source 111 at a known location that uses a photoacoustic effect. At block 803 the method comprises, using the time of arrival of the audio signal 131 to estimate a location of the mobile device 105.

Examples of the disclosure therefore provide a positioning system that can be used to estimate the location of mobile devices 105. The light sources 111 that are used to generate the audio signals can also be used to provide light for the building or area in which the system 101 is located. This minimizes the hardware that is needed to implement the examples of the disclosure as it can be provided by making slight modifications to existing light fittings.

In some examples of the disclosure the positioning system 101 can be used to replace or augment existing positioning systems such as Lidar or camera based systems. For example, the location estimates obtained using the above described positioning systems 101 could be used to reduce the processing requirements of other positioning systems.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims. For instance, in some examples the mobile device 105 doesn't need to be synchronized with the light source apparatus 101. In such examples a direction of arrival of the audio signal 131 could be determined so that triangulation rather than multilateration can be used to estimate the position of the mobile device 105. In such examples the mobile device 105 comprises an array of audio sensors 121 that are configured to detect the direction of arrival of the audio signal 131. The audio sensors 121 can be spaced apart on the mobile device 105 so that the direction of arrival of an audio signal 131 can be determined from phase and amplitude differences measured by the audio sensors 121. In some examples the audio sensors 121 could be configured in a symmetric circular or spherical array so that the response will be equal for all angles.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising at least one processor; and at least one memory including computer program code, the at least one memory and the computer program code configured to, with the at least one processor, cause the apparatus at least to:

obtain an emitting time of at least one audio signal, wherein the at least one audio signal is generated with a photoacoustic effect by at least one light source at a known location;

obtain a time of arrival of the emitted at least one audio signal in relation to a mobile device, wherein the emitted audio signal is captured at the mobile device; and estimate a location of the mobile device based on the emitting time and the time of arrival.

2. An apparatus as claimed in claim 1, wherein the at least one light source comprises a coating of photoacoustic material provided, at least partially, around the light source.

3. An apparatus as claimed in claim 1, wherein the at least one light source is coupled to a modulator for modulating intensity of light emitted by the light source.

4. An apparatus as claimed in claim 1, wherein the at least one audio signal comprises a predetermined waveform.

5. An apparatus as claimed in claim 1, wherein the at least one audio signal has a frequency outside a threshold of human hearing.

6. An apparatus as claimed in claim 1, wherein the apparatus is caused to detect a light signal, and wherein the light signal is generated from the at least one light source.

7. An apparatus as claimed in claim 6, wherein the apparatus is caused to synchronise timing between the apparatus and the at least one light source by using the light signal.

8. An apparatus as claimed in claim 1, wherein the apparatus is caused to obtain the time of arrival of a plurality of emitted audio signals at the mobile device, wherein the plurality of audio signals are generated from a plurality of light sources using the photoacoustic effect at a plurality of known locations.

9. An apparatus as claimed in claim 8, wherein the plurality of light sources are synchronised over a network.

10. A method comprising:

obtaining an emitting time of at least one audio signal, wherein the at least one audio signal is generated with a photoacoustic effect by at least one light source at a known location;

obtaining a time of arrival of the emitted at least one audio signal in relation to a mobile device, wherein the emitted at least one audio signal is captured at the mobile device; and estimating a location of the mobile device based on the emitting time and the time of arrival.

11. A mobile apparatus comprising at least one processor; and at least one memory including computer program code, the at least one memory and the computer program code configured to, with the at least one processor, cause the mobile apparatus at least to:

detect at least one emitted audio signal, wherein the at least one audio signal is generated with a photoacoustic effect at a known location; and enable the detected emitted at least one audio signal to be used to estimate a location of the mobile apparatus.

12. A method as claimed in claim 10, wherein the at least one light source comprises a coating of photoacoustic material provided, at least partially, around the light source.

13. A method as claimed in claim 10, wherein the at least one light source is coupled to a modulator for modulating intensity of light emitted by the light source.

14. A method as claimed in claim 10, wherein the at least one audio signal comprises at least one of:

a predetermined waveform; or a frequency outside a threshold of human hearing.

15. A method as claimed in claim 10, further comprising detecting a light signal, wherein the light signal is generated from the at least one light source.

16. A method as claimed in claim 15, further comprising synchronising timing between an apparatus that generated the at least one audio signal and the at least one light source by using the light signal.

17. A method as claimed in claim 10, further comprising obtaining the time of arrival of a plurality of emitted audio signals at the mobile device, wherein the plurality of audio signals are generated from a plurality of light sources using the photoacoustic effect at a plurality of known locations.

18. A method comprising:

detecting, by a mobile apparatus, at least one emitted audio signal, wherein the at least one audio signal is generated with a photoacoustic effect at a known location; and enabling the detected emitted at least one audio signal to be used to estimate a location of the mobile apparatus.

* * * * *